(12) United States Patent
Catchpole et al.

(10) Patent No.: US 8,390,669 B2
(45) Date of Patent: Mar. 5, 2013

(54) DEVICE AND METHOD FOR AUTOMATIC PARTICIPANT IDENTIFICATION IN A RECORDED MULTIMEDIA STREAM

(75) Inventors: Jason Catchpole, Hamilton (NZ); Craig Cockerton, Hamilton (NZ)

(73) Assignee: Cisco Technology, Inc., San Jose, CA (US)

( * ) Notice: Subject to any disclaimer, the term of this patent is extended or adjusted under 35 U.S.C. 154(b) by 604 days.

(21) Appl. No.: 12/638,635

(22) Filed: Dec. 15, 2009

(65) Prior Publication Data

US 2010/0149305 A1     Jun. 17, 2010

Related U.S. Application Data

(60) Provisional application No. 61/122,577, filed on Dec. 15, 2008.

(30) Foreign Application Priority Data

Dec. 15, 2008 (NO) .................................... 20085227

(51) Int. Cl.
*H04N 7/14* (2006.01)
*G06K 9/00* (2006.01)
*G10L 15/00* (2006.01)

(52) U.S. Cl. ............... 348/14.08; 348/14.09; 348/14.16; 348/515; 382/107; 382/173; 704/231; 704/236; 704/256; 704/276; 709/204; 709/231; 710/8; 725/19; 725/22

(58) Field of Classification Search ............... 348/14.08, 348/14.09, 14.16, 515; 382/173, 107; 704/231, 704/236, 256, 276; 709/204, 231; 710/8; 725/19, 22
See application file for complete search history.

(56) References Cited

U.S. PATENT DOCUMENTS

| 5,572,246 | A | * | 11/1996 | Ellis et al. ........................ 725/22 |
| 5,710,591 | A | * | 1/1998 | Bruno et al. ................ 348/14.09 |
| 5,953,439 | A | * | 9/1999 | Ishihara et al. ............... 382/107 |
| 6,377,995 | B2 | * | 4/2002 | Agraharam et al. .......... 709/231 |

(Continued)

FOREIGN PATENT DOCUMENTS

| EP | 1 482 736 | 12/2004 |
| EP | 1 798 666 A1 | 6/2007 |

(Continued)

OTHER PUBLICATIONS

Chen, Longbin, et al. "Face Annotation For Family Photo Album Management" pp. 81-94, International Journal of Image and Graphics, vol. 3, No. 1, World Scientific Publishing Co., Singapore, SG, 2003.

(Continued)

*Primary Examiner* — Gerald Gauthier
(74) *Attorney, Agent, or Firm* — Oblon, Spivak, McClelland, Maier & Neustadt, L.L.P.

(57) ABSTRACT

The present disclosure discloses a method for identifying individuals in a multimedia stream originating from a video conferencing terminal or a Multipoint Control Unit, including executing a face detection process on the multimedia stream; defining subsets including facial images of one or more individuals, where the subsets are ranked according to a probability that their respective one or more individuals will appear in a video stream; comparing a detected face to the subsets in consecutive order starting with a most probable subset, until a match is found; and storing an identity of the detected face as searchable metadata in a content database in response to the detected face matching a facial image in one of the subsets.

22 Claims, 10 Drawing Sheets

U.S. PATENT DOCUMENTS

| | | | |
|---|---|---|---|
| 7,165,029 B2 * | 1/2007 | Nefian | 704/236 |
| 7,209,883 B2 * | 4/2007 | Nefian | 704/256 |
| 7,454,342 B2 * | 11/2008 | Nefian et al. | 704/256 |
| 7,599,554 B2 * | 10/2009 | Agnihotri et al. | 382/173 |
| 7,870,574 B2 * | 1/2011 | Kenyon et al. | 725/19 |
| 2001/0042114 A1 | 11/2001 | Agraharam et al. | |
| 2003/0212552 A1 * | 11/2003 | Liang et al. | 704/231 |
| 2004/0109587 A1 | 6/2004 | Segawa et al. | |
| 2004/0122675 A1 * | 6/2004 | Nefian et al. | 704/276 |
| 2005/0071519 A1 * | 3/2005 | Hart et al. | 710/8 |
| 2007/0098303 A1 | 5/2007 | Gallagher et al. | |
| 2008/0273116 A1 * | 11/2008 | Gentric | 348/515 |
| 2009/0210491 A1 * | 8/2009 | Thakkar et al. | 709/204 |
| 2010/0149305 A1 * | 6/2010 | Catchpole et al. | 348/14.08 |

FOREIGN PATENT DOCUMENTS

| | | |
|---|---|---|
| FR | 2 852 422 | 9/2004 |
| WO | WO 2004/081814 | 9/2004 |
| WO | WO 2006/130542 A1 | 12/2006 |
| WO | WO 2007/036838 | 4/2007 |
| WO | WO 2008/045153 A2 | 4/2008 |
| WO | WO 2008/102283 | 8/2008 |

OTHER PUBLICATIONS

Viola, Paul, and Jones, Michael. "Rapid Object Detection Using a Boosted Cascade of Simple Features" IEEE Computer Society Conference on Computer Vision and Pattern Recognition, 2001.

Extended European Search Report issued May 31, 2012, in connection with counterpart European Patent Application No. 09833677.9.

* cited by examiner

| Individual information | | Unique endpoint address | | Group assosiation | | | | |
| --- | --- | --- | --- | --- | --- | --- | --- | --- |
| Image | Identity | H.323 ID | SIP URI | Department | Office | Location | Company | Histogram |
| ... | ... | ... | ... | ... | ... | ... | ... | ... |
| 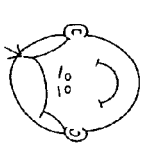 | John Doe | John.doe@AMCE.com | John.doe@AMCE.com | Finance | Building A | New York | ACME | HistMRA |
| | | MeetRoomA@AMCE.com | MeetRoomA@AMCE.com | HR | Building A | New York | ACME | HistMRA |
|  | Jane Doe | Jane.doe@AMCE.com | Jane.doe@AMCE.com | R&D | | Seattle | ACME | |
| 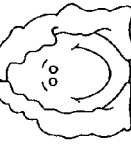 | Sara Doe | | | Finance | Building B | New York | ACME | HistMRA |
| ... | ... | ... | ... | ... | ... | ... | ... | ... |

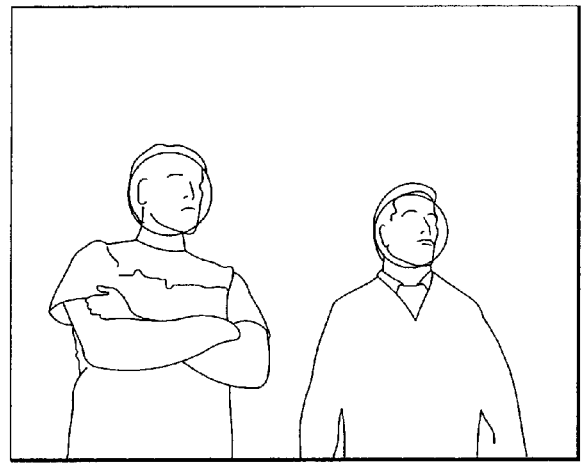
*Fig.8*
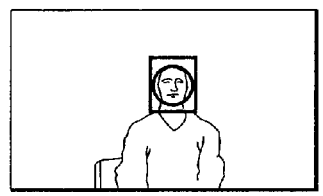 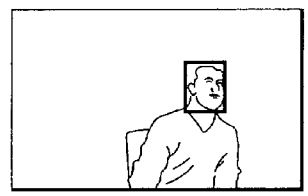 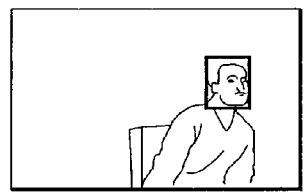
*Fig.9A*  *Fig.9B*  *Fig.9C*
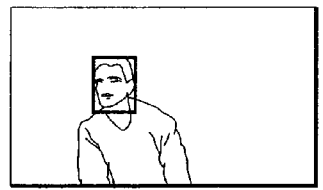  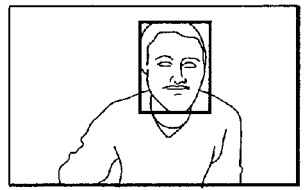
*Fig.9D*  *Fig.9E*  *Fig.9F*

DEVICE AND METHOD FOR AUTOMATIC PARTICIPANT IDENTIFICATION IN A RECORDED MULTIMEDIA STREAM

CROSS-REFERENCE TO RELATED APPLICATIONS

The present application claims the benefit of U.S. Provisional Patent Application No. 61/122,577, filed Dec. 15, 2008, the entire subject matter of which is incorporated herein by reference. The present application also claims priority from Norwegian Patent Application No. 20085227, filed Dec. 15, 2008, the entire subject matter of which is incorporated herein by reference. The present application contains related subject matter to U.S. patent application Ser. No. 11/564,589, filed Nov. 29, 2006, the entire subject matter of which is incorporated herein by reference.

TECHNOLOGICAL FIELD

The present disclosure relates to videoconferencing, particularly a face recognition method in a streaming/archiving device for video conferencing equipment.

BACKGROUND

A number of technological systems are available to have meetings among participants not located in the same area. These systems may include video conferencing, web conferencing, or audio conferencing.

The most realistic substitute for real in-person meetings is high-end video conferencing systems. Conventional video conferencing systems comprise a number of endpoints (or terminals) communicating real-time video, audio, and/or data streams over Wide Area Networks (WANs), Local Area Networks (LANs), and/or circuit switched networks. The endpoints include one or more monitor(s), camera(s), microphone(s) and/or other data capture device(s), and a codec, which encodes and decodes outgoing and incoming streams, respectively. In addition, a centralized source, known as a Multipoint Control Unit (MCU), is used to link the multiple endpoints together. The MCU performs this linking by receiving the multimedia signals (audio, video, and/or data) from endpoint terminals over point-to-point connections, processing the received signals, and retransmitting the processed signals to selected endpoint terminals in the conference.

By using a videoconferencing system, a PowerPoint presentation or any other PC-presentation, for example, may be presented while still being able to see and hear all the other videoconferencing participants.

Another conventional means of presenting multimedia content is to stream data to computers through a web interface. The data stream may be transmitted in real-time or a play back of an archived content through a streaming server. Conventional streaming data is adapted for storage and distribution, and therefore the multimedia content is represented in a different format than for video conferencing. Therefore, to allow for streaming and archiving of a conventional video conference, a system for converting the multimedia data is needed. One example of such system is described below.

A streaming/archiving server, or content server (CS), may be provided with a network interface for connecting the server to a computer network, audio/video and presentation data interfaces for receiving conference content, a file conversion engine for converting presentation content into a standard image format for distribution, and a stream encoder for encoding the content into streaming format for distribution. The streaming/archiving server is further equipped with a streaming server for transmitting the encoded audio/video content to terminals located at nodes of the network and a web server for transmitting web pages and converted presentation content to terminals located at nodes of the network. The streaming/archiving server is also adapted to create an archive file consisting of the encoded stream data, residing at local storage media or in a server/database, to enable later on-demand distribution to requestors at remote terminals over the computer network.

As shown in FIG. 1, according to a conventional mode of operation, the conference is initiated by including the streaming/archiving server 101 as a participant in the conference. The streaming/archiving server 101 accepts or places H.323 video calls 102 as point-to-point (only one H.323 system 103/104 in the call, typically used to record training materials from a single instructor) or multipoint (2-n H.323 systems in the call via an MCU in addition to the server, typically used to stream or archive meetings).

A viewer at a remote terminal (PC_1-PC_n) can access a conference by directing a conventional web browser to an Uniform Resource Locator (URL) associated with the distribution device. After completion of validation data interchanges between the viewer and the distribution device, the viewer is able to view the personal interchange, i.e., the conversation and associated behavior, occurring between the participants at the conference presenter site, as well as view the presentation content being presented at the conference site. The multimedia content is viewed in a multiple-window user interface through the viewer web browser, with the audio/video content presented by a streaming media player, and the presentation content displayed in a separate window. When requested by the head of the conference or by the conference management system, encoded stream data is stored in a server as an identifiable file.

Users that want to either download or stream recorded conferences, as described above, access a Graphical User Interface (GUI) for the streaming/archiving server, for example a web based GUI. As shown in FIG. 2, the GUI provides a list 201 of the currently stored conferences on the streaming/archiving server. The user then has to browse and/or search through the list of stored conferences looking for the one he or she wishes to view.

However, the amount of conferences stored on the streaming/archiving server increases dramatically over time and with increased use. With an increased amount of conferences come new challenges in assisting users to search and locate videos with content of interest. Conventional solutions to this problem involve the user browsing through the content to find the item of interest. This method is only feasible for servers with small collections of conferences or when locating recently recorded conferences (as they may be sorted from newest to oldest). Alternatively, conference creators can enter metadata 202 such as a brief description of the conference or keywords that describe the conference content. This enables users to locate conferences by searching for any that contain words specified in a search engine 203. However, keyword searches rely on the conference creator to manually enter the metadata 202 information. This requires a lot of manual work, and it does not guarantee that the metadata corresponds correctly to the stream data. In addition, the robustness and usefulness of the searches then depends on the verboseness and accuracy of the keywords entered by the conference creator. Further, experience has shown that users rarely take the time to change or add any metadata in their recordings/content.

Conventionally, the most common solution to this problem is to aid the user in supplying keywords. This is achieved by providing lists of broad predefined categories 204 that conference creators can choose from, that best describe the content of their conference. In addition, some automatic metrics can be utilized when browsing, such as sorting by the date and time 205 the conference was created. The problem with this approach is that there is very little metadata 202 that is automatically created. Therefore, if the conference creator does not enter additional metadata 202, the conference will not appear in any of the searches. If the content server stores a large number of conferences, browsing will not be feasible to locate the conference unless the user knows the date the conference was created.

SUMMARY

The present disclosure discloses a streaming/archiving unit including a receiver configured to receive a video conference format coded data stream; a conversion unit configured to convert the video conference format coded data stream to a multimedia stream in a defined multimedia streaming format and store the multimedia stream and searchable metadata in a content database; a user database including identities of known individuals stored with associated facial images; and a face recognition unit configured to, detect a face in a video stream included in the multimedia stream, define subsets including facial images of one or more of the known individuals, where the subsets are ranked according to a probability that their respective one or more known individuals will appear in the video stream, compare the detected face to the subsets in consecutive order starting with a most probable subset, until a match is found, and store an identity of the detected face as searchable metadata in the content database in response to the detected face matching a facial image in one of the subsets.

The present disclosure discloses a method for identifying individuals in a multimedia stream originating from a video conferencing terminal or a Multipoint Control Unit, including executing a face detection process on the multimedia stream; defining subsets including facial images of one or more individuals, where the subsets are ranked according to a probability that their respective one or more individuals will appear in a video stream; comparing a detected face to the subsets in consecutive order starting with a most probable subset, until a match is found; and storing an identity of the detected face as searchable metadata in a content database in response to the detected face matching a facial image in one of the subsets.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The disclosure will be better understood from reading the description which follows and from examining the accompanying figures. These are provided solely as non-limiting examples of embodiments. In the drawings:

FIG. 5 is an exemplary user database according to an embodiment;

FIG. 8 is an illustration of face detection results;

FIG. 9 is an illustration of face tracking; and

DETAILED DESCRIPTION

As a streaming/archiving server records (or archives) video conferences, people in the video are the most common and important element. Automatically determining the identity of everyone who appears in the conference is a useful metric to be included in the metadata for a conference recording, and provides useful avenues for user searches.

The present disclosure provides a streaming/archiving device or server, and a method for making an archived multimedia stream (e.g., video conferences and/or presented data) searchable after being archived (or recorded) on the streaming/archiving server. The streaming/archiving server may be a stand alone unit or device, or be part of other network devices, such as, but not limited to, a Multipoint Control Unit (MCU) or a gatekeeper. According to an embodiment, one or more video conference format coded data streams (e.g., coded according to H.323 or Session Initiated Protocol (SIP)) are transmitted to a conversion engine for converting the video conference format coded data stream into a standard multimedia streaming format, which may be a cluster of files, each representing a certain medium (audio, video, or data) and/or a structure file that synchronizes and associates the different media together. Exemplary formats may include Windows Media, Moving Picture Experts Group (MPEG-4), and Real Media formats. The aforementioned cluster of files is hereinafter referred to as a multimedia stream.

A face recognition unit analyzes the video stream (i.e., the video part of the multimedia stream), detecting faces and applying face recognition algorithms to a detected face to identify the participant(s) in the recorded conference. In an embodiment, the specific domain knowledge or protocol information provided by the video conferencing equipment itself is used in order to reduce the number of comparisons that need to be performed by the face recognition unit. Specific domain knowledge, as explained below, may include at least the unique address of the endpoint included in a conference (or communication session). Further, specific domain knowledge may include one or more unique addresses of one or more terminals which are an origin of the video conference format coded data stream. Furthermore, other common components of communications solutions may be used to provide further information for narrowing the search of the face recognition algorithm, thereby increasing the robustness of the results and reducing computational cost.

The face recognition unit associatively stores the identity and an image of the detected face in a content database with the multimedia stream. After this face recognition processing, searching for participants in archived conferences may be executed by a conventional search engine in a Graphical User Interface (GUI). Further, even manual browsing for an archived conference containing a particular person may be made easier since close-up images of conference participants may be displayed in the GUI.

Figure 1:
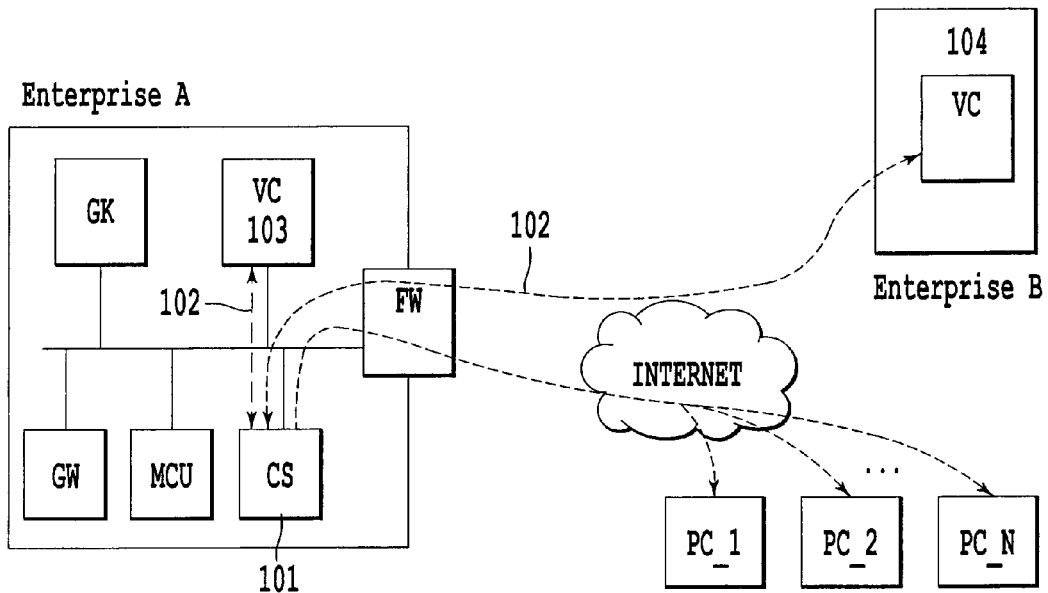
FIG. 1 is a block diagram illustrating a conventional system architecture of audio and/or video conferencing equipment in a packet switched network.
Figure 3:
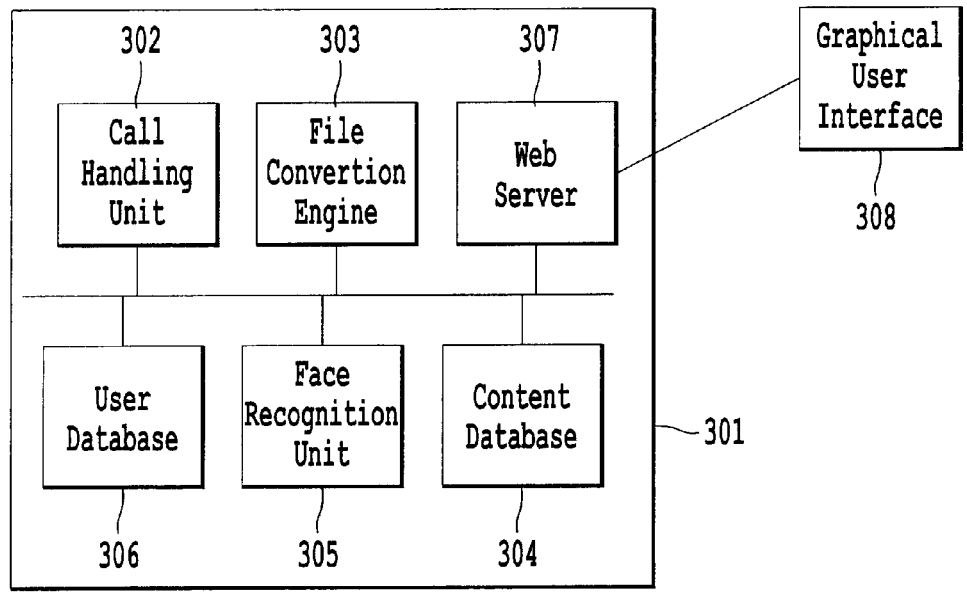
FIG. 3 is a block diagram illustrating the streaming/archiving device according to an embodiment.
Figure 2A:
FIG. 2 is a illustration of a exemplary graphical user interface for a conventional streaming/archiving server.
Figure 2B:
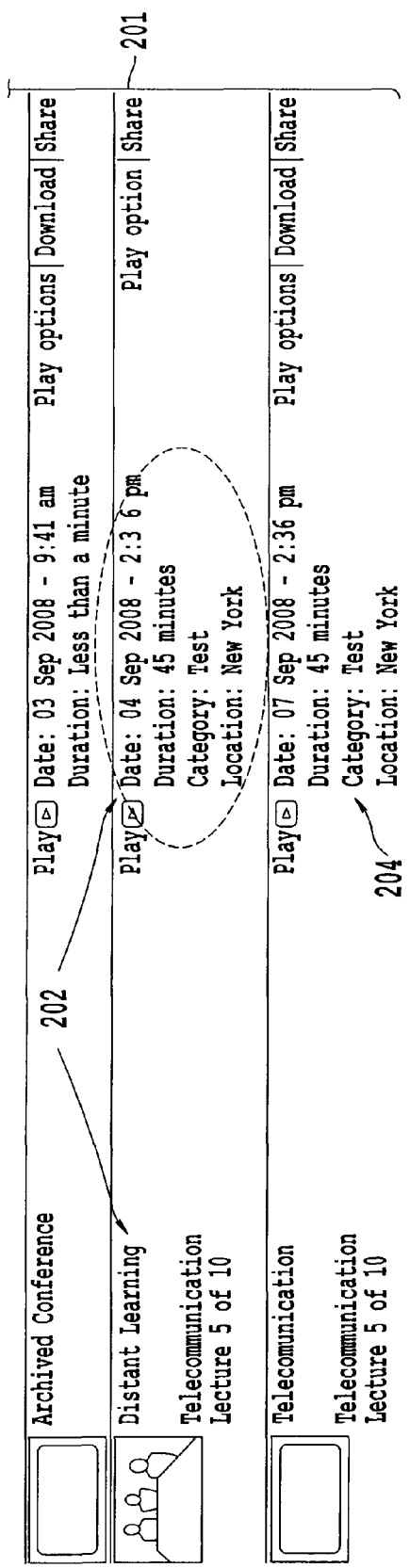
Figure 4:
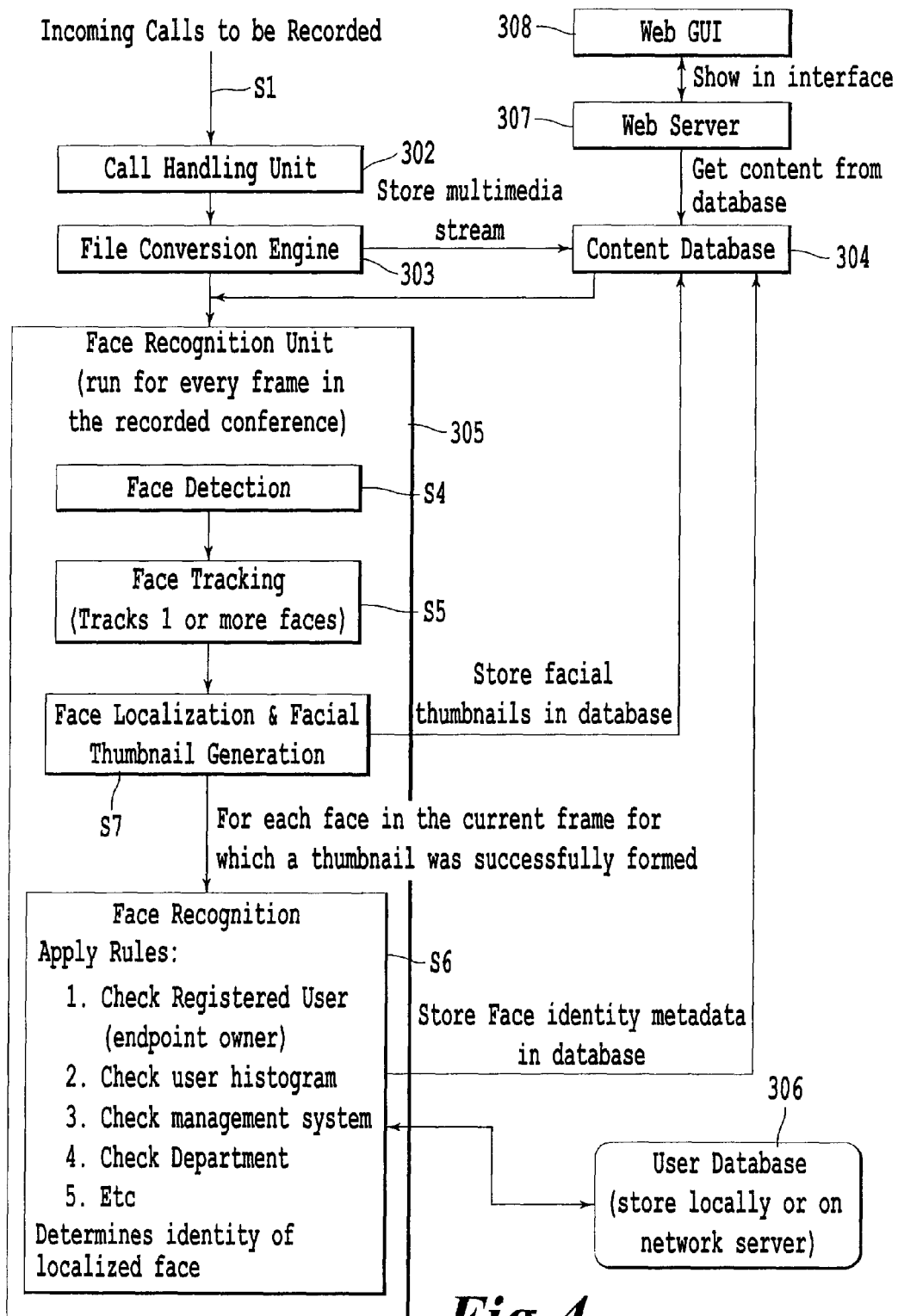
FIG. 4 is a diagram illustrating the steps performed in an embodiment.

FIG. 3 is a schematic view illustrating a streaming/archiving server 301 which is able to record video conferences in a multimedia streaming format, automatically identify individuals appearing in the multimedia stream, store the identities (for example, the names) of the identified persons as searchable metadata, and stream a chosen multimedia stream (live or on-demand) to one or more network terminals (for example, a personal computer connected to the internet). FIG. 4 is a diagram showing the interaction between the different modules of the streaming/archiving server 301. FIG. 4 will be referenced throughout the present disclosure.

According to one embodiment, the streaming/archiving server 301 comprises a call handling unit 302, a file conversion engine 303, a content database 304, a face recognition unit 305, a user database 306, and a web server 307.

In order to record a video conference on the streaming/archiving server 301, the archiving/streaming server 301 is included as a regular endpoint in a video conference. The streaming/archiving server 301 acts like any other video conferencing endpoint (also referred to as video conferencing terminal) in that it can initiate and receive communication sessions (also referred to as conference calls), as shown in FIG. 4, S1. The main difference between the streaming/archiving server 301 and any other video conferencing endpoint is that the streaming/archiving server 301 processes the data it receives into other useful outputs (such as, but not limited to, outputting to the face recognition unit 305, the content database 304, the user database 306, or the like), rather than just displaying the output on a screen. Communication sessions are handled by the call handling unit 302, and as a video conferencing endpoint the streaming/archiving server 301 uses specific, and standardized, protocols for setting up communication sessions and communicating with a remote endpoint, e.g., H.323 and SIP.

H.323 is a standard from the International Telecommunication Union Telecommunication Standardization Sector (ITU-T) for multimedia and Voice Over Internet Protocol (VoIP) which defines the protocols to provide audio-visual communication sessions on any packet network. The SIP is a signaling protocol, widely used for setting up and tearing down multimedia communication sessions such as voice and video calls over the Internet. When a communication session is established between the streaming/archiving server 301 and a video conferencing endpoint or an MCU (not shown), the incoming video conference format coded data stream (video, audio, or data) is sent to the file conversion engine 302, as shown in FIG. 4, S2. The file conversion engine converts (also referred to as transcoding) the video conference format coded data stream into at least one multimedia stream in a defined multimedia streaming format and/or a downloadable file format, such as, but not limited to, Windows Media, Moving Picture Experts Group (MPEG-4), and Real Media formats.

In FIG. 4, the file conversion engine stores S3 the multimedia stream in the content database 304. The content database 304 may reside on a local storage media or on a network server/database, and may enable later on-demand distribution to requestors at remote network terminals over a computer network (for example, the Internet). The file conversion engine 303 may also automatically store metadata associatively with the multimedia stream (or streams, if multiple streaming formats were generated). This automatically stored metadata may comprise basic file data, for example, but not limited to, the date the multimedia stream was stored in the database, the duration of the multimedia stream, a default preset title, or the like. The process of converting the video conference format coded data stream into a multimedia stream in a defined multimedia streaming format and storing the multimedia stream is referred to as recording a conference.

The user database 306 is a database containing the identities of the set of known individuals, facial images of the set of known individuals, one or more unique addresses of video conferencing terminals, and information about how the individuals and terminals are related. Each identity and unique address is associated with one or more groups. Groups may include which company or organization an individual works for, which department or office the individual works in, or other useful groupings, e.g., geographical location, which building the individual works in, or the like. For example, a user database 306 may contain records of all the employees and video conferencing terminals of a company or organization. Each record, or profile, for an employee may comprise a facial image of an employee, the name or identity of that employee, one or more unique addresses (such as, but not limited to H.323 ID, SIP address, or E.164 alias) of a video conferencing endpoint registered to the employee. Further, each employee's record comprises information about which groups the employee (and his or her endpoints) are associated with, e.g., which company or organization he or she works for, which department or office he or she works in, or other useful groupings, e.g., geographical location, which building he or she works in, or the like. Not all terminals are registered to a specific individual. For example, terminals located in meeting rooms may not be registered to a specific employee. However, a terminal may have the same grouping scheme as the individuals.

FIG. 5 shows an example of a user database 306. The user database 306 may either be generated automatically or manually. Standard company/organization employee databases and/or phone books may be used as a basis for importing data into the user database 306. The records may include more than one facial image of the employee's face, for example, one image having a front view of the face and one image having a side view of the face. The user database 306 may reside on a local storage media or on a network server/database. Throughout the present disclosure, images of employees faces stored in the user database 306 may be referred to as facial images.

In one embodiment, the face recognition unit 305 is configured to detect one or more face(s) of individuals in a video stream (video part of multimedia stream) and compare the one or more detected face(s) to one or more subsets of facial images of the set of facial images of known individuals stored in the user database 306, according to a set of rules. The steps of the face recognition unit 305 are discussed in more detail below, however for simplicity, hereinafter the phrase "detected face" is used when referring to the face being compared to the facial images in the user database 306.

When a match is found, the identity of the recognized individual is extracted from the user database 306 and associatively stored as metadata in the content database 306, together with the multimedia stream(s) and the automatically stored metadata (for example, date and duration). The face recognition process may be applied on the stored multimedia stream as a post-conversion process or it may be performed live during the conversion. Performing the face recognition process live may be resource demanding, since the streaming/archiving unit 301 needs to run both the conversion process (transcoding) and the face recognition process simultaneously. The face recognition unit 305, and possible implementations of face detection and face tracking, will be discussed in more detail below.

Figure 6A:
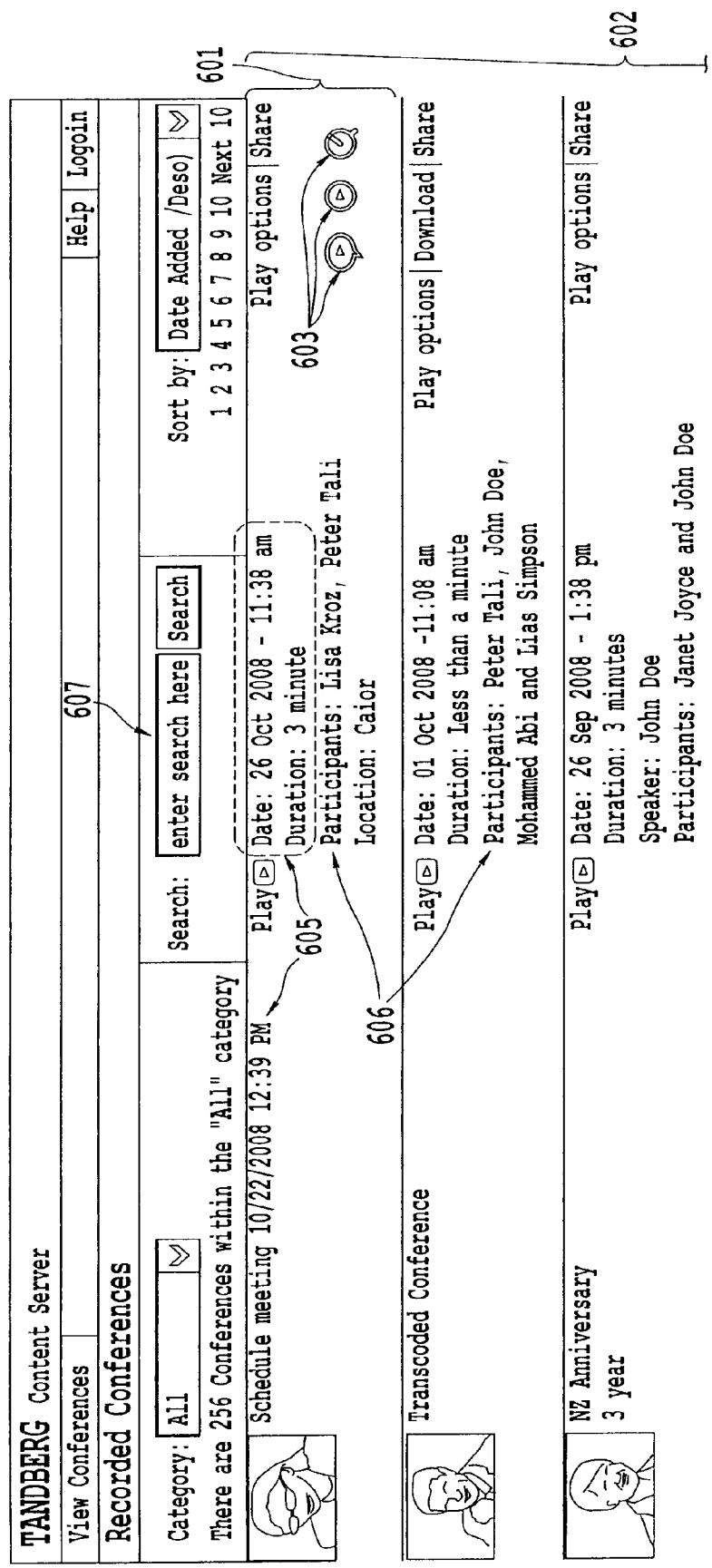
FIG. 6 is an illustration of a exemplary graphical user interface according to an embodiment.
Figure 6B:
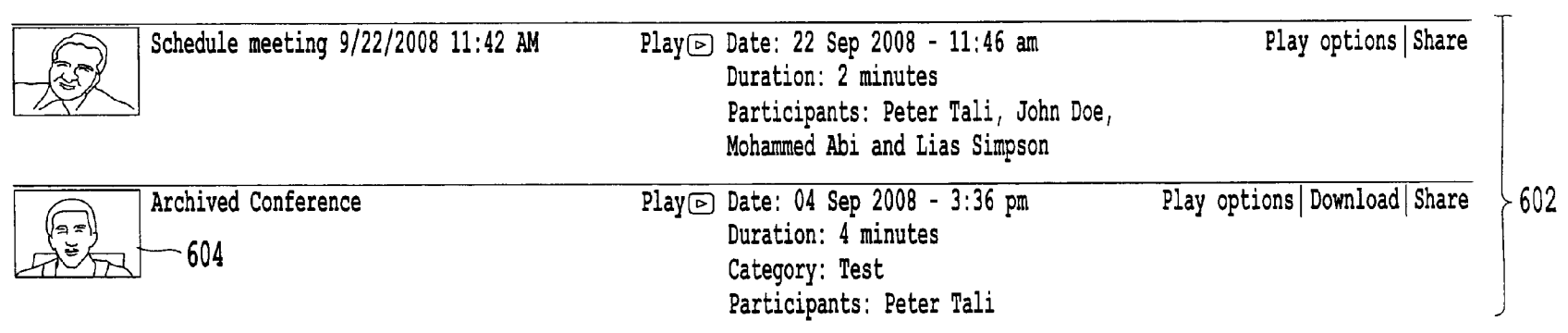

In one embodiment, the web server 307 provides a web based GUI 308 for the streaming/archiving server 301, as shown in FIG. 6. The GUI 308 provides a list 602 of the multimedia streams (i.e., recorded conferences) currently archived or stored in the streaming/archiving server's 301 content database 304. According to an embodiment, the GUI list 602 comprises several listings, columns, or fields 601 (hereinafter referred to as listings), where each of the listings represent one archived conference stored in the database (which may be stored as one or more multimedia streaming file formats and/or downloadable file formats 603).

According to an embodiment, each listing 601 comprises the automatically generated metadata 605 and the identities of the participants 606 generated by the face recognition unit 305. The GUI 308 may also comprise a search engine 607, allowing a user to search for metadata (including the identities of participants) associated with an archived conference.

According to an embodiment, each listing 601 further comprises images or thumbnails 604 of one or more of the faces of the individuals detected in the archived conference. If more than one face is detected, the thumbnail 604 may be an animation showing all images of detected users as a sequence of images (e.g., a slideshow) when, for example, a GUI 308 user holds a mouse pointer over the thumbnail 604 area.

Face recognition may be a difficult or tedious process due to the wide variety of conditions the process may be expected to work in. Examples of these difficulties may include different head poses, changing and cluttered backgrounds, low quality images, and varying illumination. Generally, the underlying face recognition techniques may be able to differentiate only between subtle differences among similar faces.

Further, typical applications of face recognition, such as biometrics and surveillance, use face recognition to determine the identity of a face from a database that can potentially contain thousands of people. The face recognition in the present disclosure utilizes domain knowledge or information (referred to as protocol information) provided by the video conferencing equipment itself. Thus, facial recognition processes may be improved by improving robustness and decreasing computational cost. In addition, the present disclosure outlines the use of other common components, typically part of visual communications solutions, to provide further information useful for simplifying the face recognition process and increasing the robustness of the face recognition results.

The streaming/archiving server 301 uses various types of information to define subsets of individuals who are probable to appear in a recorded conference. Hence, the server may start by comparing the detected face(s) in a recorded conference to a first subset of the facial images of individuals which are most probable to appear in the conference, given all available knowledge. If a match is not found in the first subset, the streaming/archiving server 301 moves on to a second subset of facial images of individuals ranked as the next most probable to appear in the conference. The system may then stop once it is confident it has found a match between the detected face and a facial image of an individual in the user database 306. Generally, the information used may reduce the number of comparisons required and the system may find the true identity with only tens of comparisons rather than hundreds or thousands. This is advantageous for two reasons. First, it reduces the computational load of the recognition process since fewer comparisons are required to find the true identity of a detected face. Second, reducing the number of comparisons increases the probability that the comparison between the recorded face and the correct face from the user database 306 yields the most confident result, thereby reducing the chance of a false match and consequently improving the reliability.

In an end-to-end video conferencing solution, numerous sources of information are available that may assist the streaming/archiving server 301 in determining the most probable users to appear in a given recorded conference. According to one embodiment, the protocol information used for establishing a communication session (or conference call) is utilized. Protocol information may include, but is not limited to, one or more unique addresses of one or more terminals which are an origin of a video conference format coded data system. As mentioned earlier, the streaming/archiving server 301 may act like any other video conferencing endpoint (or terminal) in that it can make and receive calls (or communication sessions). As an endpoint, the content server uses specific (and standardized) protocols for setting up calls and communicating with the remote endpoint. These protocols may be used to determine which endpoint(s) was used for a recording. Although the exact addressing scheme used for endpoints in a given organization is specific to how the company decides to administer its network, video conferencing endpoints generally have unique addresses. As mentioned earlier, video conference endpoints typically support multiple protocols such as SIP or H.323. Thus, there may be multiple unique addresses associated with each endpoint, such as a SIP address, an H.323 ID, or an E.164 alias.

For personal endpoints, defined as an endpoint on a user's desk or in a user's office, intended to be primarily used by a given user, the addresses often incorporate the user's name, e.g., john.doe@ACME.com. In this case, the name of the user may be extracted directly from the endpoint's unique address. Even if the address does not explicitly incorporate the user's name, the endpoint's unique address is still unique to a given user, and the identity (or name) of the participant may be found in the user database 306. Therefore, knowledge of which endpoint is involved in the recording may be used to predict who may appear in the recording.

If the streaming/archiving server 301 is in a conference call with one or more video conferencing endpoint(s) via an MCU, the streaming/archiving server 301 can receive from the MCU (via the H.243 standard protocol) the unique addresses of each endpoint contributing to the mixed video conference format coded data stream received from the MCU. Furthermore, the underlying communications infrastructure provides logical groupings of endpoints. For example, in a large company endpoints may be grouped based on which office or building they are located in. Alternatively, the grouping may be based on the role of the user to whom the endpoint is registered to. For example, all users from the accounting department may be grouped together despite being in physically different locations. Therefore, knowledge of where the endpoint is located in the network implies knowledge about other endpoints and individuals that reside in the same grouping. Often it is optimal from a network administrative point of view to have these groupings based on the geographical location of the endpoints. However, any grouping infers additional constraints on the recognition process and further reduces the complexity of the problem.

The face recognition unit 305, according to one embodiment, creates or generates a thumbnail image 604 of a detected face, as shown in FIG. 4, S7. The thumbnail image 604 is a copy of the area in a video frame of the video stream in which the area represents the face of an individual in the video frame. The face recognition unit 305 compares one or more facial features of the thumbnail image 604 to one or more feature(s) of one or more subset(s) of facial images of the known identities in the user database 306, until a match is found. More specifically, the face recognition unit 305 defines a number of subsets, where the subsets are ranked according to the probability that the individuals may appear in the video stream. Then, the face recognition unit 305 compares the detected face to the subsets in consecutive order, starting with the most probable subset, until a match is found.

A ranking may be conducted based on the protocol information and information in the user database 306. For example, it is most probable that an individual registered as the primary user of an endpoint will appear in a multimedia stream recorded from that endpoint. This is part of a "relation" in that a unique address is being related to an individual. Therefore, that individual is defined as a subset with the highest ranking. If that individual does not match the detected face, the next most probable subset may be, for example, the individuals working in the same department (part of a grouping) as the endpoint. If none of those individuals match the detected face, the next most probable subset may be, for example, the individuals working in the same office building, or the like. The first subset may consist of one (1) known face of the set of known faces, the second sub set may consist of ten (10) of the set of known faces, the third subset may consist of fifty (50) of the set of known faces, and so on until a match is found.

According to one embodiment, the face recognition unit 305 may be configured to receive protocol information from the call handling unit 302, which may at least comprise the unique address of the endpoint included in the conference (or communication session). The protocol information, as mentioned above, may include one or more unique addresses of one or more terminals which are an origin of the video conference format coded data stream. Based on the protocol information and data in the user database 306, the subsets may be consecutively ranked according to certain rules. A first subset including the individuals registered/related to the unique address may be ranked highest. A second subset including all individuals associated with a first group also associated with the unique address may be ranked second highest, e.g., the group being one of a department, office, and geographical location. A third subset including all individuals associated with a second group also associated with the unique address may be ranked third highest, e.g., the group being one of a company and an organization. A fourth subset including all individuals in the user database may be ranked fourth highest.

Depending on the information (number of and type of groupings) in the user database 306, the number of subsets may vary. Some companies, organizations, or video conferencing network owners may have many groups in a well organized hierarchical manner, giving possibilities of a detailed user database 306 grouping scheme. The streaming/archiving server 301 may be configured, for example, by an administrator to adjust the ranking procedure of the face recognition unit 305 according to the number of groups and their hierarchical order. For example, a group ranking scheme may include (1) a registered individual, (2) a department, (3) an office building, (4) a geographical location, (5) a company, or (6) all of the above.

If a specific user is not registered to the endpoint (e.g., the endpoint is a meeting room endpoint or other endpoint commonly available), the face recognition unit 305 may skip to the second subset. The face recognition unit 305 may not have to carry on to the next subset if a match is found. If a match is not found even though the face recognition unit 305 has compared the detected face to the complete set of images in the user database 306, the face recognition unit 305 marks the face track of that face, shown in FIG. 4, S5, as "unknown".

The search space, when attempting to determine the identity of a detected face, may be narrowed by incorporating learning abilities to help predict who might be seen in a conference recording from a given endpoint. Therefore, according to one embodiment, the streaming/archiving server 301 creates a histogram for each endpoint, based on who has previously used a given endpoint. In other words, the histogram is a frequency histogram in that it stores the number of times a given identity has used a particular endpoint, e.g., John used endpoint A five (5) times, Jacob used endpoint A ten (10) times, Julie used endpoint A three (3) times, etc.

In a future recording, when attempting to recognize the individual, the streaming/archiving server 301 may then use this existing histogram to determine who it is likely to see, by comparing, for example, the detected face to Jacob first, John second, and Julie third. Even if endpoint A is a meeting room system, it can still learn who uses endpoint A the most and therefore who is most probable to be using it in a subsequent recording. The endpoint histogram for an endpoint, therefore, includes a list of users who have been recognized in previous recordings from a given endpoint, as well as how many times a user may have been recognized in a recording from the given endpoint. The endpoint histogram may, for example, be a top ten (10) list of the most frequent users or may include all the users recognized during a predefined time period (e.g., during the last year). The endpoint histograms may be stored on a local storage medium, such as, but not limited to, the user database 306 or a network server/database. According to an embodiment, the individuals in a given endpoint histogram and the given endpoints are associated with the same group (i.e., a histogram group) in the user database 306, as shown in FIG. 5.

According to another embodiment, the face recognition unit 305 is configured, based on the protocol information, the endpoint histogram, and data in the user database 306, to generate a user histogram group for each terminal, wherein the most frequent users of a terminal are associated with the user histogram group. The face recognition unit 305 may then rank a subset which includes all individuals associated with a user histogram group and also associated with the unique address higher than other associated groups. One embodiment includes ranking the subsets according to certain rules. A first subset including the individuals registered/related to the unique address may be ranked highest. A second subset including all individuals associated with a histogram group for the endpoint may be ranked second highest. A third subset including all individuals associated with a first group and also associated with the unique address may be ranked third highest, e.g., the group being at least one of a department, an office, and a geographical location. A fourth subset including all individuals associated with a second group and also associated with the unique address may be ranked fourth highest, e.g., the group being at least one of a company and an organization. A fifth subset including all individuals in the user database may be ranked fifth highest.

If a specific user is not registered to the endpoint (the endpoint being a meeting room endpoint or other endpoint commonly available), the face detection unit may skip to the second subset. This approach may be particularly useful when there is a large number of people in a given office, in which case if recognition fails on the user the endpoint is registered to, the system would normally have to make comparisons to a large number of faces between people from the same office. By using the knowledge of the most frequent users of an endpoint, the search space may be reduced, as users often use the same endpoints (e.g., the meeting room endpoint closest to their office) within geographical limits of their location. Learning abilities may narrow the search parameters as time goes on and as the system learns more, thereby improving the results the more the system is used.

Furthermore, other information may be used in this learning process to further narrow the search space during face recognition. For example, if a User 1 uses Endpoint A every Monday at 10 AM, it is probable that one of the faces detected in a conference recorded from Endpoint A at 10:15 AM on a Monday belongs to User 1. Hence, the face recognition unit 305 may compare the detected faces to the image of User 1's face early in the face recognition process. Thus, the learning process may make use of when a given endpoint was used, not just who used it. This provides an additional metric to incorporate into the process of narrowing the search space, thus increasing the likelihood of determining the user's identity early on, without having to compare the face to the entire database.

Another possibility is to use a mechanism used by the streaming/archiving server 301 during operation. As an endpoint, the streaming/archiving server 301 has addressing that allows it to be called from a standard video conferencing endpoint. This addressing can specify a particular output configuration that defines the format that the output streams or downloadable files should use. Often, these addresses (also known as recording aliases) are unique to an individual and based on his or her personal preferences and needs. These aliases may be used to determine who is likely to appear in a recorded conference. Histograms, or other similar approaches, may be formed based on who uses a given recording alias. When a conference is recorded, knowledge of the recording alias used may be utilized to predict who might be present in the recorded conference. This recording alias mechanism is described in more detail in U.S. Patent Application Publication No. 2008/0072159.

Video conference equipment is often integrated with the Microsoft® Office Communications Server (OCS). The OCS provides presence information as well as access to calendar information. Presence and calendar information may be used to generate a subset of individuals probable to appear in a recorded conference. For example, if it is known that Jim is in a meeting from 4-5 PM in a certain meeting room (and it is known which endpoint is in that room), there is a high probability that Jim is in the video stream related to a recording recorded at that time from that endpoint. Furthermore, using the knowledge of who else is scheduled to be in the meeting together with Jim, the face recognition unit 305 may define a subset of individuals who are probable to appear in the recording.

Alternatively, video communication solutions often incorporate a video conferencing management system (VCMS) (or a management suite (MS)) to manage all the endpoints and other communications equipment in a video conferencing network. This includes functions such as endpoint scheduling and resource allocation. This means that the VCMS sometimes knows which individual has reserved a given endpoint. This may be true for endpoints deemed as being a common resource, such as meeting room video conferencing endpoints. The VCMS allows users to book an endpoint for a scheduled meeting. Thus, the VCMS may provide information to the streaming/archiving server 301 and the face recognition unit 305 on which user(s) currently has a given endpoint booked. This information may assist in determining individuals who are probable to appear in a recorded conference. Furthermore, the VCMS allows reoccurring conferences to be set up. These conferences occur at the same time each day, week, or month. Therefore, it is likely that face recognition results may be applicable across successive reoccurring conferences providing a good starting point for the face recognition unit 305. The VCMS's ability to book meeting room type endpoints means that when dealing with an endpoint that is not registered to a specific individual, the VCMS may be able to indicate who is using the endpoint. Thus, face recognition may be applied to the facial image of this individual first. This complements the face recognition applied to personal systems in that recognition is applied to the facial image of the individual to whom the endpoint is registered to first.

Some individuals have personal endpoints at work as well as at home. This means that their identity may be associated with multiple devices. When contacting an individual, any endpoints belonging to the user may be called. Therefore, if the individual does not answer his or her office endpoint (i.e., the individual is at home and not at the office), an automated service, such as, but not limited to, FindMe™, takes over the call handling and attempts to locate the individual by automatically calling the other endpoints associated with the individual. Thus, through the FindMe™ service, the face recognition unit 305 may determine a unique address that the individual is associated with regardless of whether the individual is dialed at work or at home. The endpoint may even require authentication to be used, which may provide even greater certainty regarding who is being recorded. However, this knowledge may not guarantee the identity of an individual, as he or she may have been authenticated by someone else. However, such knowledge may provide a good starting point for the face recognition unit 305.

In an embodiment, all available knowledge may be combined to form a probability estimate for each face in the user database 306, based on the likelihood of the face appearing in the currently processed recorded conference. The faces may then be compared to images of users, starting with the most probable user and working its way down to the least probable user.

Figure 7:
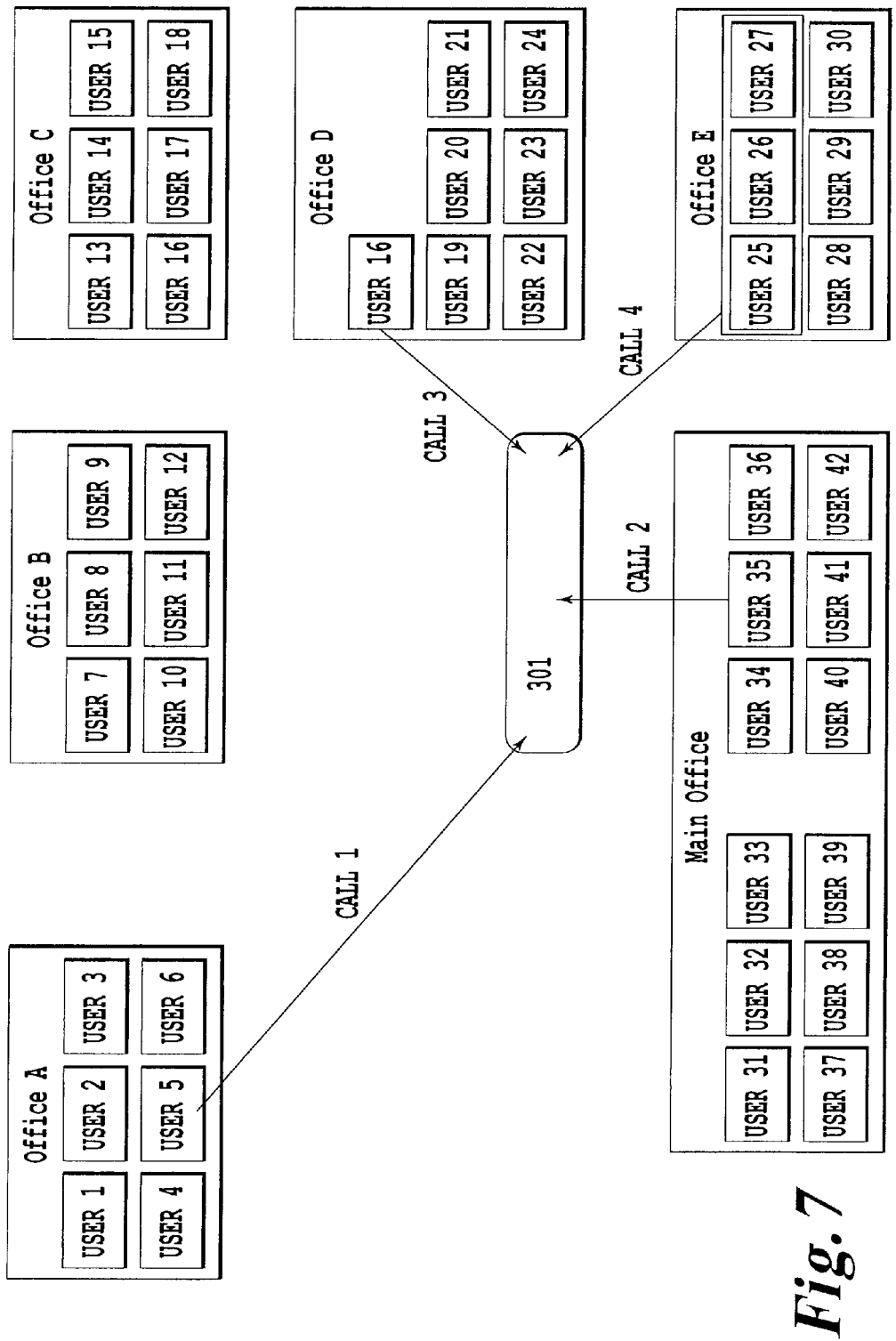
FIG. 7 is an illustration of an exemplary company.

FIG. 7 illustrates an example of an exemplary company. The following shows an example of using protocol information to reduce the complexity of the face recognition process. The example involves a hypothetical company that has six (6) offices (i.e., Office A, Office B, Office C, Office D, and Office E) with a number of individuals in each office. The example illustrates each of the individuals having a personal endpoint. In the following examples, a personal endpoint may be registered to a given individual in that he or she is the primary user, but not necessarily the only user of that particular endpoint.

First, in Call 1, a User 5 calls the streaming/archiving server 301 to make a conference recording. The conference call is converted and stored on the content database 304 as a multimedia stream. The streaming/archiving server 301 finds the unique address of the calling endpoint from the communication session. In a user database 306, the unique address of the endpoint is associated with a group, such as Office A. This means that the endpoint is located in Office A and is registered/related to the identity of User 5. The user database 306 further includes six (6) identities associated with each group. For example, Users 1-6 are associated with group Office A, Users 7-12 are associated with group Office B, etc. All the identities of Users 1-42 and the corresponding endpoints are associated with a group, such as "Company," and a facial image is stored for each user.

Based on this information the streaming/archiving server 301 knows (via the user database 306), for example, that a certain endpoint is located in Office A and it is registered to User 5. The face recognition unit 305 creates a thumbnail image 604 (as shown in FIG. 6) of a detected face in the video stream and starts comparing the thumbnail image 604 to subsets of facial images from the user database 306. It is most probable that User 5 is in the multimedia stream, since the endpoint is registered to User 5. The facial image of User 5 is then defined as a first subset comprising one (1) facial image. It is also probable that another person in Office A is using the endpoint of User 5, since they both work in the same office. The six (6) individuals (Users 1-6) associated with group Office A, are defined as a second subset comprising six (6) facial images, ranked second highest. Note that the groups and/or subsets may or may not overlap, i.e., User 5 may be in the first subset and the second subset, or just in the first subset.

Further, it is probable that any of the individuals associated with the group "Company" is using the endpoint of User 5, since they all work for the same company. Users 1-42, which are associated with group Company, are defined as a third subset comprising forty-two (42) facial images, and ranked third highest. The first subset is ranked highest, and thus, the face recognition unit 305 compares the thumbnail image 604 to the facial image of User 5 stored in the user database 306, and finds that the face detected in the video stream matches User 5. The face recognition unit 305 associatively stores the identity of User 5 (for example, the name of User 5) and the thumbnail image 604 of User 5 as metadata, together with the corresponding multimedia stream in the content database 304.

In Call 2, a User 35 calls the streaming/archiving server 301 from an endpoint registered to User 41 (and associated with groups, "Main Office" and "Company") to make a conference recording. A first subset may be the facial image of User 41, a second subset may be the facial images of individuals associated with the group, Main Office, and a third subset may be the facial images of individuals associated with the group, Company, ranked accordingly. The face recognition unit 305 first compares the thumbnail image 604 to a facial image of User 41, since this is the highest ranked subset, and determines, for example, that they do not match. The face recognition unit 305 then compares the facial image to the second highest ranked subset, namely facial images of all individuals associated with the Main Office group in the user database 306, and determines that the thumbnail image 604 matches the facial image of User 35. Hence, the correct identity of the participant detected in the conference recording is User 35.

In Call 3, User 16 from Office C visits Office D and makes a call to the streaming/archiving server 301 from an endpoint registered to User 19. During the face recognition process, the face recognition unit 305 first compares the thumbnail image 604 of the detected face to the most probable individual, i.e., the facial image of User 19 in the content database 304, and determines that they do not match. The face recognition unit 305 then compares the thumbnail image 604 to the next ranked subset, i.e., a facial image of all users associated with group, Office D, in the user database 306, and determines that there is no match. The face recognition unit 305 then compares the thumbnail image 604 to all facial images of users associated with the group Company in the user database 306 (generally all the offices except the office that was already compared, in this case, Office D), and determines that the facial image matches the image of User 16.

Call 4 involves three users (User 25, 26, and 27) in one call. This may be a call through an MCU or three users sharing a single conference room endpoint. In either of these cases the content server detects three faces in the recorded video and attempts to identify each of them. The procedure for determining the identity of each of these faces is the same as that for a single face. The face recognition unit 305 first compares each face to an image of the user registered/related to a given endpoint, then moves on to users associated with the same office or department (or other suitable preconfigured grouping), followed by all users registered to the same organization. In Call 4, all three users are from Office E, and therefore the face recognition unit 305 determines their identity quickly.

Over time, the streaming/archiving system 301 may keep track of who uses a given endpoint the most, by employing the use of the histogram. According to one embodiment, an endpoint with the unique address "End1@comp.org" is most frequently used by, for example, User 1, User 8, and User 14. The user database 306 may reflect this information by updating a histogram group, such as "HistEnd1," and associating the unique address "End1@comp.org" and the identities User 1, User 8, and User 14 with group "HistEnd1." When the face recognition unit 305 compares a detected face in a multimedia stream from the endpoint with the unique address "End1@comp.org," one of the subsets defined may be facial images of individuals associated with the group "HistEnd1," in this case, User 1, User 8, and User 14. As use of the endpoint changes over time, and other individuals enter the most frequent user list, the user database 306 continuously updates the histogram group to reflect this.

In order to perform face recognition on faces in the video, the faces may first be detected and tracked so that an image of the detected face may be passed along to the face recognition step. These steps are independent of the face recognition method according the present disclosure, yet their robustness can significantly improve the success of the face recognition step. One embodiment of each of the steps involved in the process performed by the face recognition unit 305 is discussed in the following sections. However, it should be noted that there are several conventional methods of implementing face detection, face tracking, and face recognition, and that the method below serves as an example and in no way should be conceived as limiting the scope of the present disclosure.

According to one embodiment, the face recognition unit 305 is configured to receive a video stream, e.g., the video part of a multimedia stream (either a stored multimedia stream or directly from the conversion engine), as shown in FIG. 4, S8. For each frame in the video stream, a face detection unit searches for faces. FIG. 8 shows the kind of output produced by the face detection unit. Such output may include identifying regions in the image believed to be faces. There are a variety of conventional techniques to achieve this. One example found in Paul Viola and Michael J. Jones, "Rapid Object Detection using a Boosted Cascade of Simple Features," *IEEE CVPR,* 2001, the entire subject matter of which is incorporated herein by reference, uses a series, called a cascade, of trained classifiers. These cascades are trained on large sets of images both with and without faces, called positive and negative samples, and may learn distinguishing features of a face. When applied to an image (in this case a single frame from a video stream), each classifier from the cascade is applied to regions of the image that increase in size at each iteration. If any stage of the cascade rejects the notion of a face in a given region, the process stops. The cascade is constructed such that early stages use simple features that can quickly reject regions that clearly are not faces, thus making the approach computationally efficient.

Back to FIG. 4, if one or more faces are detected S4 in a video frame, a face tracking unit initiates tracking S5 of the detected face(s) using the initial face location(s), as provided by the face detection unit. Tracking allows the detected face to be tracked throughout the remaining of the video stream. Thus, one successful recognition may be needed for each face that appears in the video stream. Minimizing the number of recognitions that are performed is important as face recognition can be a computationally expensive operation.

FIG. 9 demonstrates the process of tracking. The circle in image 9a shows the result of face detection. This initializes the tracker for that face, which is shown as the rectangle. The other images (9b-9f) depict this face tracked in subsequent frames. Tracking algorithms are more suited for locating a given face throughout a video stream, compared to applying face detection in every frame. This is because face detection is not as robust to pose changes as the tracking algorithm, and is intermittent in its ability to re-detect all faces in all frames. In addition, the face detection process has no concept of which face is which between subsequent detections. Thus, it may not be well suited for tracking. In contrast, tracking algorithms take the face's previous location into account and thus search for nearby regions similar to the face region from previous frames in the video stream. Furthermore, tracking algorithms are computationally less expensive than performing face detection for each frame.

After the detected faces have been tracked, face detection is performed periodically to check for any new faces that may have appeared in the video stream. Because the locations of the currently tracked faces are known, the system may determine if subsequent detections are new or are re-detections of faces that have already been tracked.

When a face has been tracked, the face recognition unit 305 then makes a thumbnail image 604 (i.e., a copy) of the detected and tracked face, where the facial image is the only part of the video frame limited by the tracking rectangle. This thumbnail image 604, which may contain only the face of the tracked user, may then be used for face recognition and compared, or matched, to the stored facial images of known individuals in the user database 306.

Having obtained a thumbnail image 604 of the face of an individual that appears in the video stream, face recognition can now be applied to determine the person's identity. Face recognition may be applied to any number of faces that have been successfully detected in a given frame. The amount of processing time that may be dedicated to this process is dictated by whether this operation is being performed post-conversion or in real-time. When operating post-conversion, there is more flexibility in terms of how much time the recognition process may take, thus it may apply recognition to every face in the frame, e.g., every face that is large enough to be tracked, and produce thumbnail images 604 suitable for face recognition. Given enough computational resources this process may even be performed in real-time. However, the maximum number of faces that may be recognized for a given frame may be finite due to the time constraints that exist when operating in a real-time settings.

Generally, not all faces being tracked need to have recognition applied in a single frame. Often, a well localized and frontal facing thumbnail image 604 may be produced intermittently, thus it is unlikely recognition would need to be applied for all individuals in one frame, and instead recognition operations may be dispersed throughout the duration of the call. Furthermore, once a thumbnail image 604 has been extracted for a tracked individual, the recognition process may be applied in the background while tracking continues in real-time for the other individuals. Alternatively, if the recognition results are not needed immediately, the thumbnail images 604 may be queued and processed at a later stage (for example, offline). In addition, the reduction in search space according to the present disclosure increases the likelihood of face recognition being performed in real-time, when compared to conventional face recognition systems that may compare each face to an entire database of faces. Generally, a tracked face may be recognized successfully once, after which the face is simply tracked and recognition may not be applied to this face again.

In order to apply face recognition, the face recognition unit 305 may first be trained by providing a set of images of each individual and his or her identity. The training process may be performed only once. When performing recognition on the thumbnail images 604, the system starts by comparing the thumbnail images 604 to the facial images of known individuals in the user database 306 according to the method discussed above. Processing stops once the system is confident it has found a match. The measure of confidence in a face recognition system is generally based on how similar any two faces are computed to be.

If the identity of a face cannot be established, the face's identity is classified as an unknown. If there are unknown people, video conference owners, or a user responsible for recorded conference, may manually specify their identity. If a person's identity is desired for future conference recordings in which he or she may appear, additional training images of the individual may be provided, thus adding this individual to the list of known individuals in the user database 306. Thus, if this person appears in future conference recordings, his or her identity may be found by the face recognition unit 305. Alternatively, the images of the faces previously defined as unknown from the video may be used as training images, thus not requiring the user to enter more training images. Another possible enhancement is to use any new additions to the user database 306 of known individuals to compare to any unknown faces from previous conferences. Therefore, if an unknown face has appeared in previous conferences, all conferences where this individual appears may be updated, thus allowing future searches to be more accurate.

Figure 10:
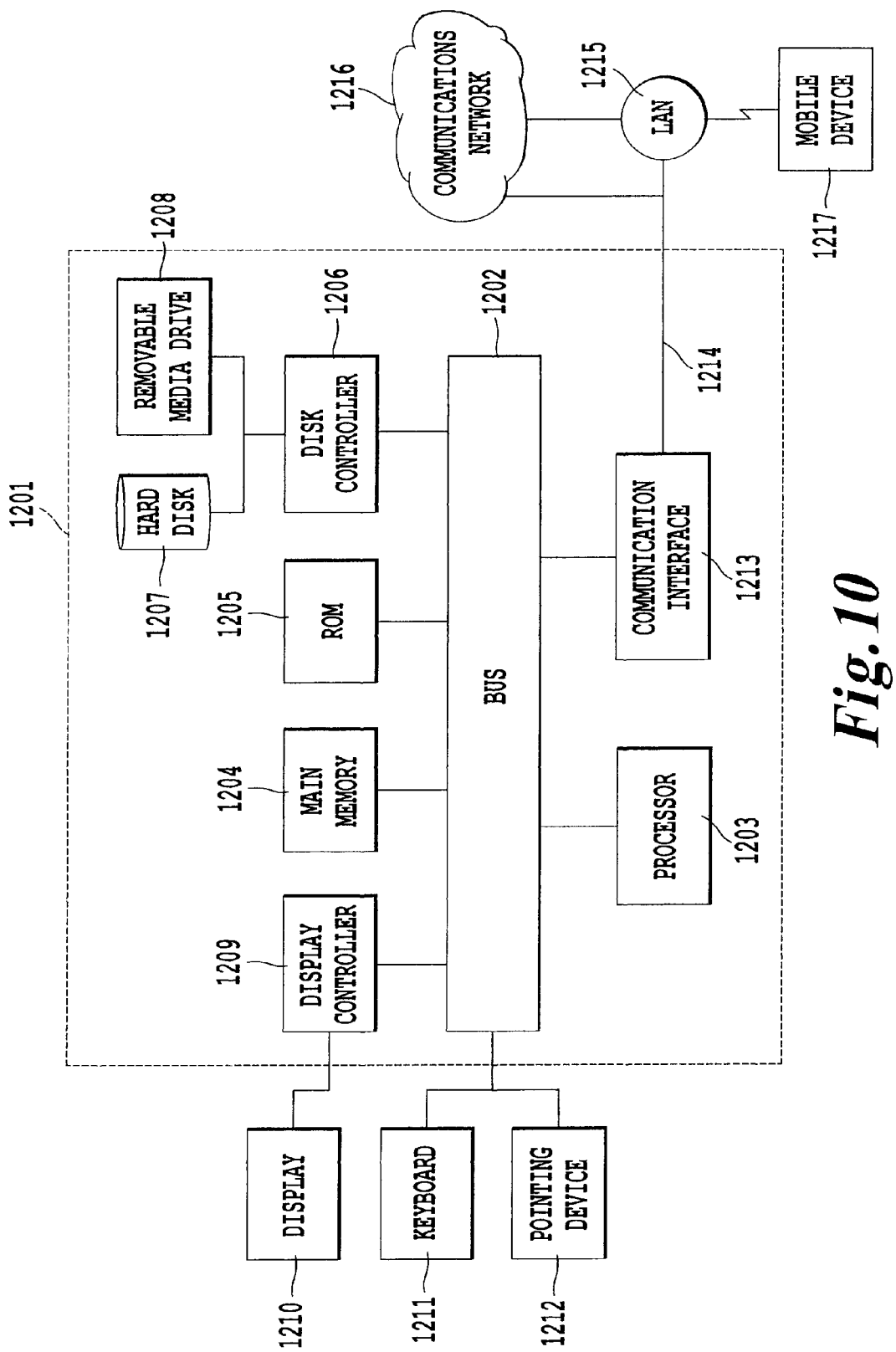
FIG. 10 illustrates a computer system upon which an embodiment of the present disclosure may be implemented.

FIG. 10 illustrates a computer system 1201 upon which an embodiment of the streaming/archiving device, according to the present embodiments, may be implemented. The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The content database 304 or the user database 306, for example, may be implemented on the hard disk 1207 or the media drive 1208. The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a touch panel display or a liquid crystal display (LCD), for displaying information to a computer user. The GUI 308, for example, may be displayed on the display 1210. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208.

One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, other embodiments may include the use of a carrier wave (described below), or any other medium from which a computer can read. Other embodiments may include instructions according to the teachings of the present disclosure in a signal or carrier wave.

Stored on any one or on a combination of computer readable media, the present disclosure includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a is carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Further, it should be appreciated that the exemplary embodiments of the invention are not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the invention, as set forth above are intended to be illustrative, not limiting. The various changes may be made without departing from the spirit and scope of the invention. Therefore, the systems and methods according to exemplary embodiments of this invention are intended to embrace all now known or later-developed alternatives, modifications, variations and/or improvements.

The invention claimed is:

1. A device comprising:
a receiver configured to receive a video conference format coded data stream;
a conversion unit configured to convert the video conference format coded data stream to a multimedia stream in a defined multimedia streaming format and store the multimedia stream and searchable metadata in a content database;
a user database including identities of known individuals stored with associated facial images; and
a face recognition unit configured to,
detect a face in a video stream included in the multimedia stream,
define subsets including facial images of one or more of the known individuals, where the subsets are ranked according to a probability that their respective one or more known individuals will appear in the video stream,
compare the detected face to the subsets in consecutive order starting with a most probable subset, until a match is found, and
store an identity of the detected face as searchable metadata in the content database in response to the detected face matching a facial image in one of the subsets.

2. The device according to claim 1, further comprising:
a ranking unit configured to rank the subsets based on protocol information extracted from a communication session and based on groups in the user database,
wherein the user database further includes one or more unique addresses of known terminals, the identities and unique addresses being associated with one or more of the groups, and at least one of the unique addresses being related to one or more of the known individuals.

3. The device according to claim 2, wherein the protocol information includes the one or more unique addresses of one or more terminals which are an origin of the video conference format coded data stream.

4. The device according to claim 1, wherein the face recognition unit is further configured to create a thumbnail image of the detected face and store the thumbnail image with the multimedia stream in the content database.

5. The device according to claim 1, further comprising a graphical user interface including a listing of available multimedia streams in the content database, the listing including a link to a stored multimedia stream and the searchable metadata associated with the multimedia stream, including the names of recognized participants.

6. The device according to claim 5, wherein the listing further includes one or more stored thumbnail images of individuals detected in each multimedia stream.

7. The device according to claim 1, wherein the video conference format coded data stream is a H.323, H.320, or Session Initiated Protocol coded data stream.

8. The device according to claim 2, wherein the face recognition unit is further configured to rank the subsets based on the one or more unique addresses according to a first subset including the known individuals related to the one or more unique addresses, a second subset including all known individuals associated with a first group also associated with the one or more unique addresses, and a third subset including all known individuals associated with a second group and associated with the one or more unique addresses.

9. The device according to claim 8,
wherein the first group is selected from at least one of a department, a geographical location, a building, an office, and a floor, and
wherein the second group is selected from at least one of a company, an organization, and a set of known individuals.

10. The device according to claim 8, further comprising:
a ranking unit ranking a fourth subset higher than the second subset, the fourth subset including all known individuals associated with a user histogram group and associated with the one or more unique addresses of the known terminals,
wherein the face recognition unit is further configured to generate a user histogram group for each terminal, wherein previous users of each terminal are associated with the user histogram group.

11. The device according to claim 8, further comprising:
a ranking unit configured to rank a fifth subset higher than the second subset, the fifth subset including facial images of known users in a list of probable users,
wherein the face recognition unit is further configured to generate the list of probable users of each of the known terminals at a given time, based on information from at least one of a scheduling server and a presence server.

12. A method for identifying individuals in a multimedia stream originating from a video conferencing terminal or a Multipoint Control Unit, the method comprising:
executing, at a device, a face detection process on the multimedia stream;
defining, at the device, subsets including facial images of one or more individuals, where the subsets are ranked according to a probability that their respective one or more individuals will appear in a video stream;
comparing, at the device, a detected face to the subsets in consecutive order starting with a most probable subset, until a match is found; and
storing, at the device, an identity of the detected face as searchable metadata in a content database in response to the detected face matching a facial image in one of the subsets.

13. The method according to claim 12, further comprising:
receiving a video conference format coded data stream;
storing, in a user database, one or more unique addresses of known terminals and identities of known individuals, wherein the identities of known individuals and unique addresses are associated with one or more groups, and wherein at least one of the unique addresses are related to one or more of the known individuals;
extracting protocol information from a communication session; and
ranking the subsets based on the protocol information and at least one of the groups in the user database.

14. The method according to claim 13, wherein the protocol information includes the one or more unique addresses of one or more terminals which are an origin of the video conference format coded data stream.

15. The method according to claim 12, further comprising:
creating a thumbnail image of the detected face; and
storing the thumbnail image with the multimedia stream in the content database.

16. The method according to claim 12, further comprising providing a graphical user interface including a listing of available multimedia streams in the content database, the listing including a link to a stored multimedia stream and the searchable metadata associated with the multimedia stream, including the names of recognized participants.

17. The method according to claim 16, wherein the listing further includes one or more stored thumbnail images of individuals detected in each multimedia stream.

18. The method according to claim 13, wherein the video conference format coded data stream is a H.323, H.320, or Session Initiated Protocol coded data stream.

19. The method according to claim 13, further comprising ranking the subsets according to a first subset including the known individuals related to the one or more unique addresses, a second subset including all known individuals associated with a first group also associated with the one or more unique addresses, and a third subset including all known individuals associated with a second group and associated with the one or more unique addresses.

20. The method according to claim 19,
wherein the first group is selected from at least one of a department, a geographical location, a building, an office, and a floor, and
wherein the second group is selected from at least one of a company, an organization, and a set of known individuals.

21. The method according to claim 19, further comprising:
generating a user histogram group for each terminal, wherein previous users of a terminal are associated with the user histogram group; and
ranking a fourth subset higher than the second subset, the fourth subset including all known individuals associated with the user histogram group and associated with the one or more unique addresses of the known terminals.

22. The method according to claim 19, further comprising:
generating a list of probable users of each of the known terminals at a given time, based on information from at least one of a scheduling server and a presence server; and
ranking a fifth subset higher than the second subset, the fifth subset including facial images of known users in the list of probable users.

* * * * *